United States Patent [19]

Nakano et al.

[11] Patent Number: 4,984,904
[45] Date of Patent: Jan. 15, 1991

[54] APPARATUS FOR CONTINUOUSLY MEASURING TEMPERATURE OF MOLTEN METAL AND METHOD FOR MAKING SAME

[75] Inventors: Masao Nakano, Higashi-Sumiyoshi; Keiichi Mori, Hyogo; Yoshitaka Hiraiwa, Fukuoka; Shoji Iizuka, Kita-Kyushu; Shozo Shima; Yukio Nakamura, both of Chiba, all of Japan

[73] Assignees: Kawaso Electric Industrial Co., Ltd., Osaka; Kurosaki Refractories Co., Ltd., Kita-Kyushu; Nippon Steel Corporation, Tokyo, all of Japan

[21] Appl. No.: 336,333

[22] Filed: Apr. 11, 1989

[51] Int. Cl.$^5$ .......................... G01K 1/08; G01K 7/02
[52] U.S. Cl. ..................................... 374/139; 374/208; 374/140; 266/88; 266/95; 136/234; 136/232
[58] Field of Search ........................ 374/208, 139, 140; 136/234, 232, 230, 228; 266/88, 95

[56] References Cited

U.S. PATENT DOCUMENTS

| | | | |
|---|---|---|---|
| 2,303,704 | 12/1942 | Oseland | 374/140 |
| 3,106,493 | 10/1963 | Japka | 374/139 |
| 3,530,716 | 9/1970 | Truppe et al. | 374/140 |
| 3,580,078 | 5/1971 | MacKenzie | 374/139 |
| 3,580,744 | 5/1971 | Inouye et al. | 374/139 |
| 3,610,045 | 10/1971 | Shearman | 374/139 |
| 3,647,558 | 3/1972 | McMurtry | 374/140 |
| 3,647,559 | 3/1972 | Truppe et al. | 374/140 |
| 3,680,382 | 8/1972 | Vaiden | 374/140 |
| 3,923,552 | 12/1975 | Parris | 374/208 |
| 4,430,518 | 2/1984 | Nakajima et al. | 374/139 |
| 4,693,614 | 9/1987 | Hatono et al. | 374/122 |
| 4,721,533 | 1/1988 | Phillippi et al. | 374/179 |
| 4,721,534 | 1/1988 | Phillippi et al. | 374/179 |
| 4,776,705 | 10/1988 | Najjar et al. | 374/141 |

FOREIGN PATENT DOCUMENTS

| | | | |
|---|---|---|---|
| 2411995 | 10/1974 | Fed. Rep. of Germany . | |
| 1569518 | 4/1969 | France . | |
| 61-68525 | 4/1986 | Japan | 374/139 |
| 246636 | 11/1986 | Japan | 374/139 |
| 63-247629 | 10/1988 | Japan | 374/139 |
| 7910 | 6/1908 | United Kingdom | 374/140 |
| 1136973 | 12/1968 | United Kingdom . | |
| 2045433 | 10/1980 | United Kingdom | 374/208 |

OTHER PUBLICATIONS

"Instrumentation and Control", Journal No. 9, Sep. 1971, Dukarskii, et al. (Soviet Union).

Primary Examiner—William A. Cuchlinski, Jr.
Assistant Examiner—Diego F. F. Gutierrez
Attorney, Agent, or Firm—Sixbey, Friedman, Leedom & Ferguson

[57] ABSTRACT

An apparatus for continuously measuring temperatures of molten metal including a thermocouple unit (A) and an immersion protection tube unit (B), wherein the thermocouple unit (A) comprises a thermocouple (1) having an end equipped with a temperature sensing element (8) and an opposite end connected to terminals (2), an insulator (9) of substantially one piece containing the thermocouple (1), a porcelain protection tube (6) of high airtightness containing the insulator (9), and a terminal box (3) having an extension sleeve (5) with which the upper part of the porcelain protection tube (6) is held and having a housing (20) which contains the terminals (2). The immersion protection tube unit (B) comprises an alumina-graphite protection tube (21), a holding sleeve (22) with a flange which is connected to the upper part of the alumina-graphite protection tube (21), and a connecting sleeve (26) connected with the holding sleeve (22). The porcelain protection tube is detachably inserted into the alumina-graphite protection tube (21) to allow easy removal of the thermocouple and alumina-graphite protection tube (21). Further, the alumina-graphite protection tube (21) is manufactured by a process of adding a resin type binder which has high carbonization yield to a compounding component formed of a mixture of graphite powder, a powder selected from and/or mixed with a powder of SiC derivatives, Si derivatives, $ZrO_2$—$SiO_2$ derivatives, $Al_2O_3$—$ZrO_2$—$SiO_2$ derivatives, and a powder of substantially granular and/or powdered alumina, and then subsequently kneading the mixture, forming it into a tube and sintering the formed tube.

9 Claims, 5 Drawing Sheets

APPARATUS FOR CONTINUOUSLY MEASURING TEMPERATURE OF MOLTEN METAL AND METHOD FOR MAKING SAME

BACKGROUND OF THE INVENTION

A. Industrial Applications

The present invention relates to improvements in an apparatus for continuously measuring temperature of molten metal. More specifically, the invention relates to improvements in the apparatus for continuously measuring the temperature of molten steel in a tundish of a continuous casting process.

B. Prior Art

As an apparatus for continuously measuring the temperature of molten steel in a tundish by the use of a thermocouple, a publicly known arrangement is to insert a thermocouple into a protection tube whose compositions comprise alumina and graphite.

Since the temperature of the molten steel in the tundish is over 1500° C., generally, as the thermocouple, a platinum-platinum/rhodium alloy thermocouple (including a type R thermocouple equipped with a positive electrode comprising an alloy of 87% platinum and 13% rhodium and a negative electrode comprising platinum, and a type B thermocouple equipped with a positive electrode comprising an alloy of 70% platinum and 30% rhodium and a negative electrode comprising an alloy of 94% platinum and 6% rhodium) is used.

It has been found that when the platinum-platinum/rhodium alloy thermocouple is used at high temperature, if it is exposed to a reductive atmosphere or metallic steam, carbon, sulfur, silicon and the like, it deteriorates rapidly, leading to burnout of the thermocouple.

For this reason, conventionally, inert gas is introduced into the alumina-graphite protection tube or a venting of the gas from the protection tube is carried out.

In addition, the conventional continuous temperature measuring apparatus has employed an arrangement in which the alumina-graphite protection tube, which is to be immersed in the molten steel in the tundish, is adapted to act as an outer tube, while a porcelain protection tube is adapted to act as an inner tube so that the thermocouple is inserted into the porcelain protection tube which is then inserted into the alumina-graphite protection tube. An alternative arrangement may be employed in which the porcelain protection tube has a triplex-layer construction, whose structure includes an inner sub-tube and an outer sub-tube. At the same time, a gap between the alumina-graphite protection tube and the porcelain protection tube is filled with electrically insulating powder, e.g. alumina powder.

The aforementioned prior art faces difficulties in replacement of the thermocouple, when such an accident as burnout of the thermocouple takes place in the apparatus, and in reuse of the apparatus, once it has already been used for a continuous measurement, while keeping the thermocouple housed in the porcelain protection tube.

In particular, when preheating the apparatus before immersing the same, a considerable temperature change takes place during the primary stage of such preheating which, along with other causes, has been found to give rise to burnout of the thermocouple, resulting in a demand for quick countermeasures against such a burnout, if necessary.

SUMMARY OF THE INVENTION

It is an object of the present invention to provide an apparatus, and method for making such an apparatus, for continuously measuring the temperature of molten metal comprising a thermocouple unit and an immersion protection tube unit.

Another object of the present invention is to provide a temperature measuring apparatus, having such a construction as mentioned above, wherein the thermocouple unit can be easily separated from the immersion protection tube unit so that replacement of the thermocouple unit can be simply performed.

Yet another object of the present invention is to provide a temperature measuring apparatus, having such a construction as mentioned above, in which the thermocouple unit can be easily removed from the immersion protection tube unit so that replacement of a deteriorated immersion protection tube can be accomplished without damage to the thermocouple, allowing reuse of the thermocouple unit.

Still another object of the present invention is to provide a temperature measuring apparatus which provides a structure for securing the element wires of the thermocouple so they are not burdened with a load to prevent breakage of the thermocouple.

It is also an object of the present invention to provide a temperature measuring apparatus in which the element wires of the thermocouple are protected from a harmful environment due to chemical change by a porcelain protection tube of high airtightness.

Finally another object of the present invention is to provide a temperature measuring apparatus and method for producing an alumina-graphite tube, partially constituting the temperature measuring apparatus, of such a construction and composition as to reduce the amount of deterioration of the element wires of the thermocouple due to chemical changes and to speed up the response process of the apparatus.

These objectives and others are accomplished by a thermocouple unit comprised of a thermocouple having a temperature sensing element at one end and terminal connections at an opposite end, an electrical insulator extending in a longitudinal direction within which the thermocouple is housed, a porcelain protection tube which houses the insulator for reducing the permeability of the air therethrough to a considerable extent, and a terminal box having a housing in which the terminals are contained and from which an extension sleeve extends, the upper part of the porcelain protection tube being covered thereby.

The immersion protection tube unit comprises an alumina-graphite protection tube, a holding sleeve with a flange which is coupled to the upper part of the alumina-graphite protection tube, and a connecting sleeve which is coupled to communicate with the upper portion of the holding sleeve.

To combine both of the units, the porcelain protection tube of high airtightness of the thermocouple unit is detachably inserted into the alumina-graphite protection tube of the immersion protection tube unit. The extension sleeve of the thermocouple unit is also detachably inserted into the connecting sleeve of the immersion protection tube unit and are united to cause the extension sleeve and the connecting sleeve to be detachably fixed to each other.

With such an arrangement, releasing of the uniting means enables the thermocouple unit to be replaced with respect to the immersion protection tube unit. For this reason, if bounout of the thermocouple should be discovered, it is possible to replace the old thermocouple unit with a new thermocouple unit with respect to the immersion protection tube unit.

On the other hand, when the apparatus has already been used for measuring temperature, and the immersion protection tube unit has become exhausted, the apparatus allows the immersion protection tube unit, which has been exhausted, to be replaced with a new immersion protection tube unit in a manner that enables the thermocouple unit to be reused. Therefore, even though it may be difficult to reuse the immersion protection tube unit comprising the alumina-graphite protection tube due to its limited anticorrosion and spalling resistance properties, the thermocouple unit is protected by the porcelain protection tube and cannot be easily influenced by a change in the atmosphere within the immersion protection tube unit, thus preventing a chemical change leading to deterioration of the element wires of the thermocouple. Furthermore, since the continuous measuring time, during which a thermocouple is immersed into the molten metal, is limited to the time of use of the apparatus (which is within 20 hours per operation or 6 to 10 hours due to a replacement of a new tundish, if a different kind of molten steel is charged from a ladle into the tundish, or due to a problem affecting the life of the tundish), use of the thermocouple in one operation of the apparatus does not cause the thermocouple unit to be wasted since the separate replaceability of the protection tube enables it to be used a plurality of times. In addition, the thermocouple unit is so structured that the element wires of the thermocouple are not subjected to a load by the weight of the insulator and themselves, so that breakage of the thermocouple can be prevented.

According to the present invention, the alumina-graphite protection tube constituting the immersion protection tube undergoes a process of adding a resin type binder whose carbonization yield is high relative to a compounding component comprising a mixture of graphite powder, a powder selected from and/or mixed with a powder of SiC derivatives, Si derivatives, $ZrO_2$-$SiO_2$ derivatives, $Al_2O_3$-$ZrO_2$-$SiO_2$ derivatives, and mixtures thereof, and with the remaining powder being substantially of granular alumina and/or powdered alumina. The binder and compounding ingredient are formed into the resultant product by kneading the mixture, forming the kneaded mixture into a tube and sintering the tube so that the quantity of $SiO_2$ in the product is less than 8% by weight. Such a construction partially solves the problem of deterioration of the element wires of the thermocouple due to chemical change. Furthermore, the rate at which electromotive force builds up from the thermocouple is, also, high enough to realize a shortening of its response time.

DETAILED DESCRIPTION OF THE PREFERRED EMBODIMENTS

Throughout the Figures of the drawings the same numerals are used for corresponding elements with prime (') designations being employed to indicate a modification from one embodiment to another.

A description of the embodiments of the apparatus for continuously measuring the temperature of molten metal (hereinafter referred to as the temperature measuring apparatus) according to the present invention is made in conjunction with the accompanying drawings as follows:

In all the embodiments, the measuring apparatus comprises a thermocouple unit A and an immersion protection tube unit B. While various different inner structures for the thermocouple unit A are mentioned hereunder, the construction of the immersion protection tube unit B is common to all of the embodiments.

Figure 1:
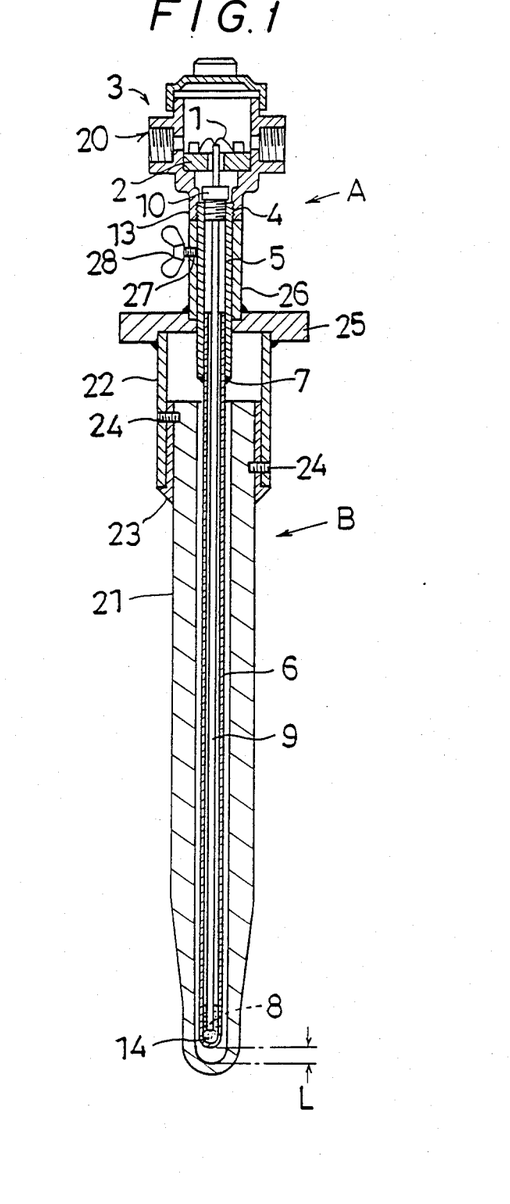
FIG. 1 is a front vertical sectional view illustrating, as a whole, an embodiment of the temperature measuring apparatus according to the present invention.
Figure 2:
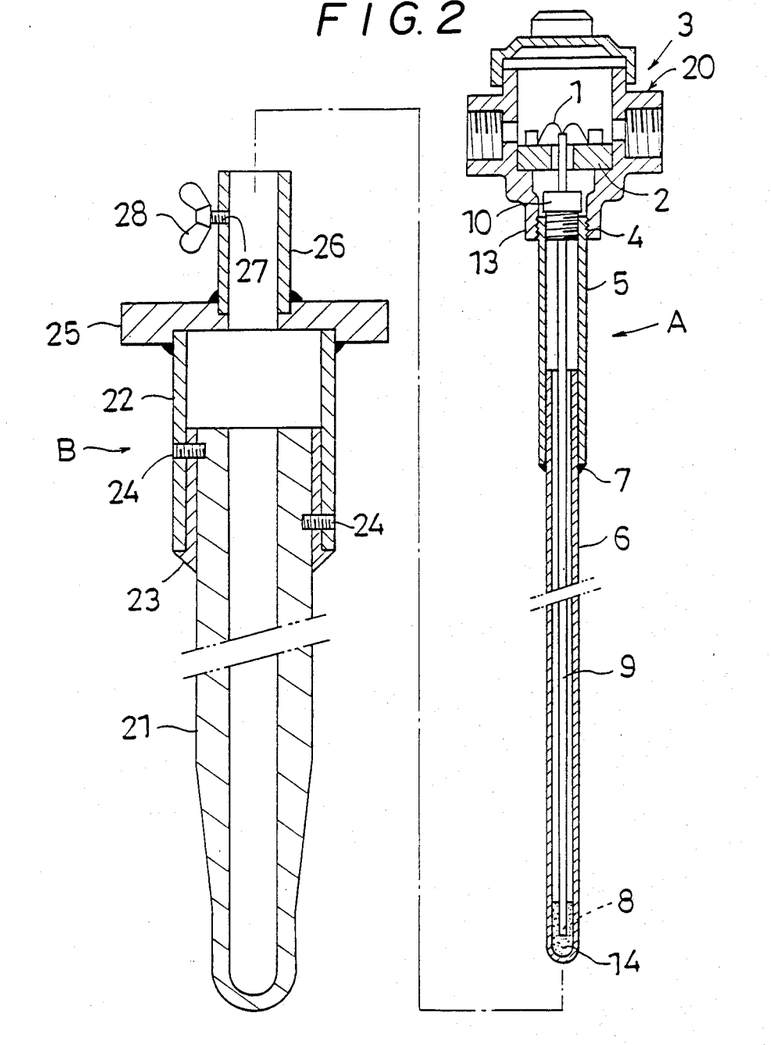
FIG. 2 shows the FIG. 1 embodiment in an exploded vertical in which the apparatus is disassembled into a thermocouple unit and an immersion protection tube unit.

The construction of the thermocouple unit A is as follows:

In FIGS. 1 and 2, the thermocouple unit A is equipped with a terminal box 3 including terminals 2 through which thermocouple 1 is connected to an outer measuring system (not shown).

The terminal box 3 is provided with a cylindrical part 13 which is extended downward from a housing 20 in which the terminals 2 are contained, and a metallic sleeve 5 is screwed, through thread parts 4, to cylindrical part 13.

The thermocouple unit A is designed to have an arrangement in which an upper part of a porcelain protection tube 6, which is highly impervious to air, is inserted into a lower part of extension sleeve 5 where it is adhesively fixed by a fire resistant adhesive 7, which may be fireproofing cement.

The present embodiment employs an airtight porcelain protection tube 6 whose purity is higher than that of a porcelain protection tube in Class 1 of the Japanese Industrial Standard. An alternative arrangement includes an idea for achieving a higher degree of airtightness by means of covering or coating the surface of the tube 6 with a material which, when using the thermocouple at high temperature, does not give rise to a component harmful to it.

In accordance with this embodiment, for thermocouple 1, a type R thermocouple is used whose wire diameter is 0.3 mm. Since operating conditions presently used in continuous casting processes lead to a maximum use for continuously measuring the temperature of molten steel of 10 hours or so, the thermocouple has a life long enough to bear the necessary specifications of such a temperature measurment. A thermocouple whose wire diameter is less than that of the aforementioned example may be used. In addition, in the case where it is intended to reuse the same thermocouple unit A, while only the immersion protection tube unit B is replaced, it is also contemplated, in accordance with the invention, to use a thermocouple whose wire diameter is larger than the aforementioned example, e.g. 0.5 mm or more. Type B thermocouples and other ones suitable for the purpose of the measuring temperature may also be used.

Figures 7, 8A:
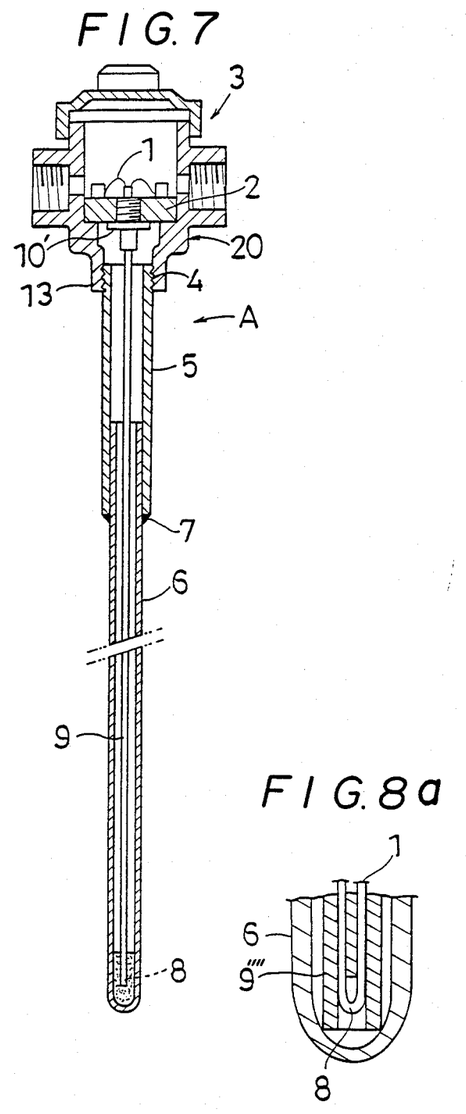
FIG. 7 is a sectional view of the thermocouple unit with a modified arrangement for fixing the insulator.
FIG. 8a is an enlarged view of the encircled portion of FIG. 8.

In particular, since the temperature sensing element 8 at the end of thermocouple 1 is easily burdened by loads imposed due to tensile forces from expansion and contraction of the thermocouple during temperature changes, it is preferable to adopt a structure for the thermocouple in which it is held by an insulator which will prevent the element wires of the thermocouple being burdened with a load. Namely, in order to avoid a load in which the deadweight of insulator 9 causes thermocouple 1 to be burdened, a one-piece type insulator is adopted, and, if possible, the insulator 9, whose length is as long a possible, is closely connected to the thermocouple so that they may be constructed as one unit to realize a similarity of the construction incurred by the one-piece type insulator. The upper part of insulator 9 is held fixed to housing 20 of terminal box 3 or extension sleeve 5, or it is fitted down into porcelain protection tube 6. In the embodiment illustrated by FIGS. 1 and 2, for example, a method of holding the upper part of insulator 9 by a fixing fitting 10 and screwing such fitting 10 in cylindrical part 13 of terminal box 3 is adopted. On the other hand, such an embodiment as shown in FIG. 7 has fixing fitting 10 holding the upper part of insulator 9 screwed into the lower side of terminals 2 in housing 20 in order to fix insulator 9 in a suspended configuration.

Figure 3:
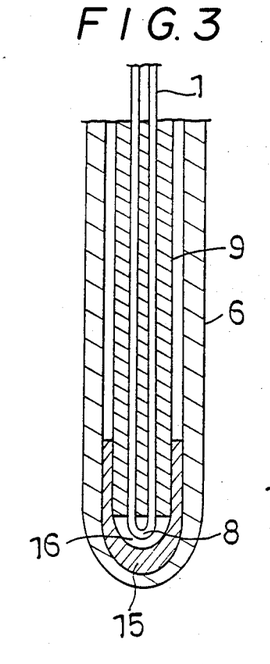
FIG. 3 is a partial sectional view of one embodiment of a structure for fixing a temperature sensing element of the thermocouple.

Since temperature sensing element 8, at the end of thermocouple 1, can be easily damaged if it is freely movable, due to contact between the thermocouple and the end face of insulator 9, it is preferable to adopt a structure in which temperature sensing element 8 does not move inside of porcelain protection tube 6 or cannot be easily moved therein. With the embodiment as shown in FIGS. 1 and 2, for example, in order that temperature sensing element 8 does not move inside of porcelain protection tube 6, insulating powder 14, such as high purity alumina powder and the like, is filled therein to form a fixture for element 8. Fixing temperature sensing element 8 is not limited only to this method, and while a filling of granulated or irregularly lumped insulation may be accepted, a further alternative may be an interposition of a formed article of cylindrical shape or other adequate shape as shown in FIG. 3, where a cap-shaped article of insulation 15 is fitted into the bottom of porcelain protection tube 6 in an insertional manner. The inner face of insulation article 15, at the bottom, is equipped with an approximately hemispherical chamber 16 for housing temperature sensing element 8. The fixture is made such that the end of insulator 9 that is inserted into the formed insulation article 15 does not make contact with the bottom of the inner face of formed article 15, whereby temperature sensing element 8 at the end of thermocouple 1 is contained in chamber 16.

Figure 4:
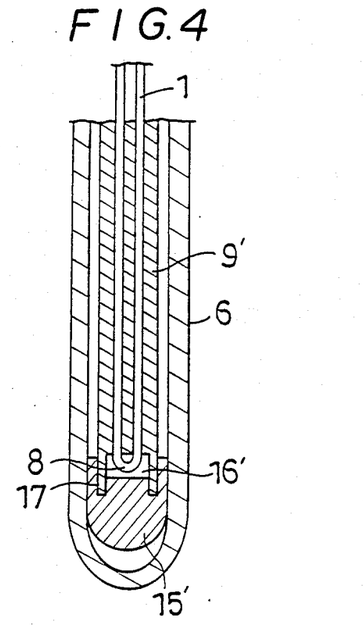
FIG. 4 is a partial sectional view of another embodiment of a structure for fixing the temperature sensing element of the thermocouple.

With the embodiment of FIG. 4, an irregularly lump-shaped, formed article of insulation 15' is insertionally fitted into the bottom of porcelain protection tube 6. The lower end part of an insulator 9' is fitted into an annular groove 17 of formed article 15'. The inner end surface of formed article 15', which is surrounded by annular groove 17, forms housing chamber 16', in which temperature sensing element 8 at the end of thermocouple 1 is contained, together with the lower end of insulator 9 that is received in groove 17.

The insulator 9, 9', in which thermocouple 1 is housed, must be formed of a material that will not give rise to a component harmful to the thermocouple when using the present apparatus at high temperatures. It is preferable for insulator 9, 9' to be an equivalent material to that use for porcelain protection tube 6.

Figure 5:
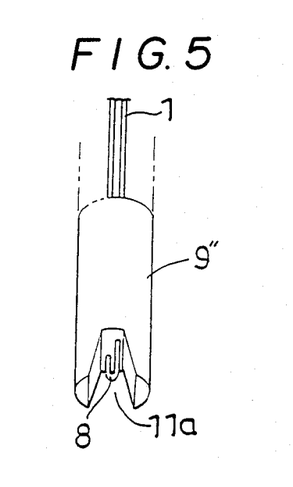
FIG. 5 is a partial perspective view of one embodiment of an end structure of an insulator.

As shown in FIG. 5, an insulator 9" is shown that has a lower end that is formed with a V-shaped notch 11a for enclosing the temperature sensing element 8 of the thermocouple.

Figure 6:
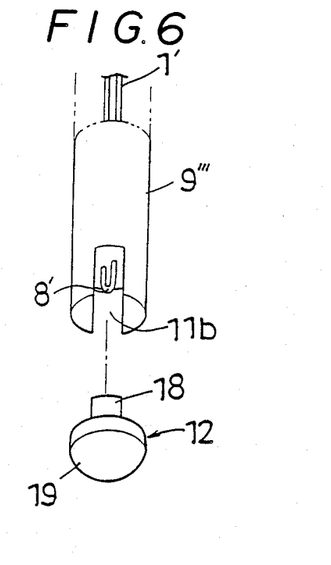
FIG. 6 is a partial perspective view of another embodiment of the end structure of the insulator.

Furthermore, an insulator 9''' may be used that has a lower end formed with a slit-like notch 11b, as shown in FIG. 6 for enclosing the temperature sensing element 8 of thermocouple 1. Instead of article 15, 15', end member 12 is used which is equipped with a leg 18 that fits into the notch 11b in a manner that applies no pressure to the temperature sensing element 8. Such a resultant fixture arrangement prevents the temperature sensing element 8 from moving within the lower end of porcelain protection tube 6. It is recommended that a head 19 of end member 12 rest upon the inside of the lower end of porcelain protection tube 6.

Figure 8:
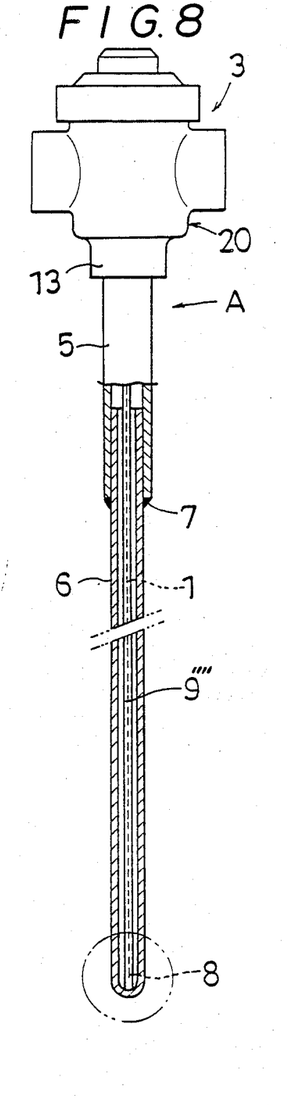
FIG. 8 is a partial sectional view of the thermocouple unit with another insulator installation arrangement.

The porcelain protection tube 6 and insulator 9, 9', 9", 9''' are preferably constructed out of materials whose coefficients of thermal expansion are substantially identical to each other, since damage could result if there is a difference in the coefficients of thermal expansion. Furthermore, as shown in FIGS. 8 and 8a, an alternative arrangement is also possible in which, without using an insulating powder 14 or a formed article of insulation 15 or 15', or end member 12, as mentioned above, temperature sensing element 8 can be positioned slightly recessed within the lower end of insulator 9'''' which contacts the inner face of the bottom end of porcelain protection tube 6, allowing for expansion and contraction of insulator 9'''' when there is a difference in coefficients of thermal expansion between the insulator 9'''' and the porcelain protection tube 6.

So long as the arrangement of the thermocouple 1 will not result in burdening of element 8 with a load and will not permit unreasonable movement of the temperature sensing element 8, any other adequate methods for fixing the thermocouple with the insulator and protection tube may be used with the apparatus of the present invention.

A description of the construction of the immersion protection tube unit B of FIGS. 1 and 2 now follows:

Among the materials from which the immersion protection tube unit B may be formed is an alumina-graphite protection tube 21 made out of material whose quality is identical to that as utilized for the type of alumina-graphite tube used in a long nozzle for continuous casting and the like. There is a necessity of adopting a material which will not result in the thermocouple being exposed to an atmosphere which could deteriorate it, or at least it will be difficult for the material to give rise to such an atmosphere, when using the present apparatus at high temperature. For this reason, the alumina-graphite protection tube of the preferred embodiments disclosed here has a component construction that is different from that of the alumina-graphite protection tube which is ordinarily marketed.

Namely, according to the present invention, alumina-graphite tube 21 is prepared through the processes of: adding a resin, as a binder, whose carbonization yield is high relative to compounding ingredients comprised of 10 to 40 wt % graphite powder, 1 to 10 wt % powder selected from and/or mixed with powder of SiC derivatives, Si derivatives, $ZrO_2$-$SiO_2$ derivatives, $Al_2O_3$-$ZrO_2$-$SiO_2$ derivatives and the mixture thereof, and the 50 to 89 wt % remainder being of substantially granular alumina and/or powdered alumina; kneading the resulting product together and subsequently sintering it so that the quantity of the $SiO_2$ component contained in the alumina-graphite tube 21 is less than 8 wt %. This limits the occurrence of SiO gas, whose combination with Pt in the thermocouple forms $Pt_5Si_2$ in a grain boundary causes the platinum to become fragile, because the quantity of $SiO_2$ in the resulting alumina-graphite protection tube 21 is decreased to the indicated percentage.

For this reason, a limit which reduces the quantity of $SiO_2$ component within 8 wt % provides a countermeasure to a cause of thermocouple deterioration. Namely, a reduction of the content of $SiO_2$ component, which acts as a factor in causing the burnout of the element wires of the thermocouple in alumina-graphite tube 21 used in immersion protection tube unit B within 8 wt %, allows one of the causes for the deterioration of the wires of the thermocouple due to the following chemical change to be solved:

$$SiO_2 + C \rightarrow SiO \uparrow + CO \uparrow$$

Such an arrangement also improves the heat conductivity of the alumina-graphite protection tube 21. Namely, limiting of the quantity of $SiO_2$ (which has a lower heat conductivity) which constitutes a part of the component construction of the alumina-graphite tube improves the heat conductivity of the tube so that the speed of temperature response becomes quick.

The reason for fixing the amount of graphite powder at 10 to 40 wt % is that, if less than 10 wt % is used there is a shortage of spalling resistance and thermal conductivity, while if over 40 wt % is used there is a shortage of corrosion resistance and strength.

In addition to that, a reason for fixing the powder amount of SiC, Si, and $ZrO_2$-$SiO_2$ or $Al_2O_3$-$ZrO_2$-$SiO_2$ derivatives at 1 to 10 wt % is that, if less than 1 wt % is used there is an insufficient amount to achieve its function for preventing oxidation of graphite and its dissolution into the molten metal which reduces the corrosion resistance, while if over 10 wt % is used insufficient corrosion resistance results.

As for the granular alumina and/or powdered alumina, a limit is not particularly placed upon electro fused material, sintered material and calcined material. According to the present invention, a limit is not put upon $\alpha$-$Al_2O_3$, $\beta$-$Al_2O_3$ as the granular and/or powdered alumina. It is not recommended to use a great amount of $\beta$-$Al_2O_3$, because it contains $Na_2O$ or $K_2O$. However, if the amount of $SiO_2$ is within the limit of less than 8 wt % after sintering has been performed, the addition of a slight amount of silica powder, mullite, andalusite, silimanite and the like may also be accepted, because such an arrangement makes an improvement in spalling resistance.

Since the resin being used as the binder prevents a rise in porosity and a lowering in strength of the sintered article, a recommended type of resin should have a higher carbonization yield. For example, phenolic resin, furan resin, epoxy resin, pitch, and various kinds of pitch denatured phenolic resin may be used. As mentioned above, no limit is placed upon the property of the resin except for a necessity for higher carbonization yield.

As for the sintering step, a cold isostatic press and extrusion press are suitable for use in accordance with the invention. Generally use of a cold isostatic press is preferred, but use of such a method is not required.

According to a specific preferred embodiment of the present invention, an alumina-graphite tube 21 is obtained whose $SiO_2$ content is 6.2 wt %. This is achieved by adding a phenolic resin, as the binder, to compounding ingredients comprising 27 wt % of graphite powder, a powder mixture of 3 wt % SiC and 1 wt % Si, and the remainder being granular alumina and alumina powder, then kneading the resulting product, followed by pressing the same with a cold isostatic press, and sintering it at 1000° C. The following data concerning such an alumina-graphite protection tube are included:

(Heat conductivity)
 at 200° C.→19.5
 at 400° C.→17.6
 at 600° C.→17.0
 at 800° C.→16.9
 (Unit: kcal/m h deg.)
(Specific heat)
 0.21 Kcal/kg. deg. at 800° C.
(Density)
 2600 kg/m³.

As a result, in comparison with the characteristics of an alumina-graphite protection tube which has been conventionally marketed, improvements contributing directly to a speeding-up of the thermocouple response process, an advancement in the following-up of the temperature, and the like have been made.

Figure 10:
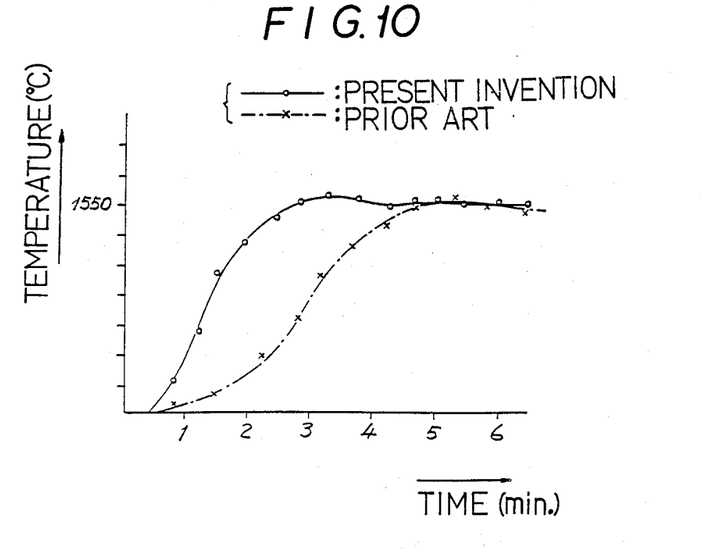
FIG. 10 is a table representing a test result on the basis of an optimum embodiment according to the present invention.

The graph shown in FIG. 10 represents the results of an inhouse test that was performed, with a prior art protection tube and with the alumina-graphite protection tube according to the present specified embodiment. These results indicate that it takes about 5 minutes for the conventional article to reach a temperature enabling commencement of the response process, while the apparatus of the present invention takes only about a half of the aforementioned time for the same purpose.

The alumina-graphite protection tube 21, of cylindrical shape which has a tapered closed end, such as a closed end arrangement, is not essential.

While the upper part of alumina-graphite protection tube 21 is fixed by a fire-resistant adhesive member 23, e.g. fireproofing cement and the like, and inserted into metallic holding sleeve 22, it is also fixed by a plurality of set screws 24 at the same time. The holding sleeve 22 is equipped with a flange 25 which is fixed thereto by a welding. When installing the temperature measuring apparatus in the field, the entire part of the immersion protection tube unit B is supported by flange 25. A metallic connecting sleeve 26 is fixed to stand on the upper part of flange 25 by welding. The connecting sleeve 26, flange 25, and alumina-graphite protection tube 21 are coaxially disposed to communicate with one another.

Thus, the thermocouple unit A is detachably assembled into the immersion protection tube unit B. Namely, porcelain protection tube 6, into which insulator 9 of thermocouple 1 in thermocouple unit A is housed, is inserted by way of the opening on the upper part of connecting sleeve 26 inside of alumina-graphite protection tube 21 into the immersion protection tube unit B. The extension sleeve 5, which depends from the terminal box 3 of the thermocouple unit A, is inserted into connecting sleeve 26 of the immersion protection tube unit B, and connecting sleeve 26 is adapted to contact the lower end of cylindrical part 13 of terminal box 3. Once so arranged, a fixing tool 28, such as a thumbscrew and the like, is screwed in through a small threaded hole 27 made in the side face of connecting sleeve 26, thereby fixing the thermocouple unit A to the immersion protection tube unit B. The means for detachably fixing extension sleeve 5 and connecting sleeve 26 to each other is not limited to the aforementioned fixing tool 28, but has a wide scope of employing various kinds of detachable mounting methods.

When units A and B are fixed together (as shown in FIG. 1) and exposed to the heat from the molten steel, because there is a difference in coefficient of thermal expansion between that of porcelain protection tube 6 and that of alumina-graphite protection tube 21 of the immersion protection tube unit B, it is preferable to provide for a clearance L between the end of porcelain protection tube 6 and the end inside of alumina-graphite protection tube 21 to accommodate the differing rates of thermal expansion.

When detaching the thermocouple unit A from the immersion unit B, the fixing tool 28 is simply loosened, thereby releasing the interconnection therebetween.

Figure 9:
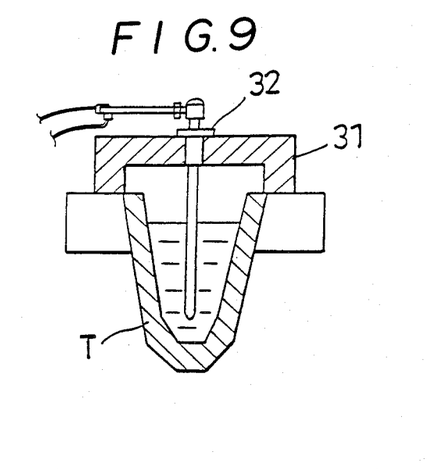
FIG. 9 is a diagrammatic depiction illustrating use of a temperature measuring apparatus according to the present invention.

As shown in FIG. 9, the temperature measuring apparatus of the present invention, which comprises the aforementioned construction, is installed in a hole 32 by inserting the temperature measuring apparatus in an upper lid 31 of the tundish T prior to pouring of the molten steel. The temperature measuring apparatus is sufficiently heated together with residual heat from the tudish T to avoid damaging of the alumina-graphite protection tube 21 and porcelain protection tube 6 due to a rapid heat change.

Additionally, in order to avoid a rise in temperature of terminals 2 in terminal box 3 of the thermocouple unit A when measuring the temperature of the molten steel, a pressurized inert gas and the like is introduced into terminal box 3 by a known method that allows the inside of the terminal box 3 to be cooled.

As set forth above in the objects and description of the apparatus for continuously measuring the temperature of molten metal, the present invention achieves the following effects:

(1) The construction of the temperature measuring apparatus of the present invention employs a construction for the thermocouple unit and immersion protection tube unit which, when combined, is superior in operation.

(2) The temperature measuring apparatus of the present invention, having such a construction as mentioned above, allows easy separation of the thermocouple unit and the immersion protection tube unit from each other, so that a replacement of the thermocouple unit can be simply performed.

(3) The temperature measuring apparatus of the present invention, having such a construction as mentioned above, allows easy removal of the thermocouple unit from the immersion protection tube unit, so that it is easy to handle, when reusing the thermocouple unit.

(4) The temperature measuring apparatus of the present invention has a construction in which the element wires of the thermocouple are not subjected to any loading that, when using the apparatus, will cause the thermocouple wires to break.

(5) The temperature measuring apparatus of the present invention has a construction that uses a highly air impermeable porcelain protection tube so that deterioration of the element wires of the thermocouple due to the chemical change can be prevented.

(6) The composition and manner of forming the alumina-graphite tube of the present invention renders the temperature measuring apparatus more responsive.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

What is claimed is:

1. An apparatus for continuously measuring the temperature of molten metal comprising a thermocouple unit and an immersion protection tube unit, wherein:

said thermocouple unit comprises a thermocouple temperature sensing element comprising a platinum-platinum/rhodium alloy thermocouple and terminals connected therewith, an insulator containing said thermocouple, a porcelain protection tube into which said insulator is inserted, and a terminal box having an extension sleeve with which the upper part of said porcelain protection tube is held and having a housing which contains said terminals;

said immersion protection tube unit comprises an alumina-graphite protection tube having an $SiO_2$ component of less than 8 wt %, a holding sleeve into which the upper part of said alumina-graphite protection tube is fixedly inserted, and a connecting sleeve connected with said holding sleeve;

said porcelain protection tube of said thermocouple unit is detachably inserted into said alumina-graphite protection tube of said immersion protection tube unit with said extension sleeve of said thermocouple unit being detachably inserted into said connecting sleeve of said immersion protection tube unit; and a fixing means detachably fixes said extension sleeve and said connecting sleeve with each other to allow easy removal of said thermocouple unit from said immersion protection tube unit.

2. The apparatus for continuously measuring temperature as set forth in claim 1, wherein said porcelain protection tube is formed of a porcelain which is substantially air impermeable.

3. The apparatus for continuously measuring temperature as set forth in claim 1, wherein said thermocouple temperature sensing element is protected from engaging said porcelain protection tube.

4. The apparatus for continuously measuring temperature as set forth in claim 1, wherein said insulator is of a substantially one-piece construction and contains said thermocouple.

5. The apparatus for continuously measuring temperature according to claim 4, wherein an article of insulation is provided at an end of the insulator at which said sensing element is disposed as a means for protecting said temperature sensing element against contact with said porcelain protection tube.

6. The apparatus for continuously measuring temperature of claim 1, wherein said alumina-graphite protection tube is of sintered alumina-graphite from a resin type binder of a high carbonization yield, a graphite powder, a powder of a material selected from the group consisting of: SiC derivatives, Si derivatives, $ZrO_2$-$SiO_2$ derivatives, $Al_2O_3$-$ZrO_2$ derivatives, and mixtures thereof; and substantially granular and/or powdered alumina.

7. The apparatus for continuously measuring temperature according to claim 6, wherein said sintered alumina-graphite protection tube comprises 10 to 40 percent by weight of said graphite powder, 1 to 10 percent by weight of said powder selected from said group consisting of: SiC derivatives, Si derivatives, $ZrO_2$-$SiO_2$ derivatives, $Al_2O_3$-$ZrO_2$-$SiO_2$ derivatives, and mixtures thereof; and 50 to 89 percent by weight of said substantially granular and/or powdered alumina.

8. An apparatus for continuously measuring the temperature of molten metal comprising a thermocouple unit and an immersion protection tube unit, wherein:
said thermocouple unit comprises a thermocouple temperature sensing element comprising a platinum-platinum/rhodium alloy thermocouple and terminals connected therewith, an insulator which contains said thermocouple, a porcelain protection tube into which said insulator is inserted, a terminal box having a housing which contains said terminals and provides a cylindrical part extending downward therefrom, and an extension sleeve screwed into said cylindrical part with which the upper part of said porcelain protection tube is held;
said insulator provides its upper part with fixing means which is fixed to said terminal box so as to suspend the insulator without engaging said porcelain protection tube;
said immersion protection tube unit comprises a protection tube, a holding sleeve into which the upper part of said protection tube is inserted and fixed by a fire-resistant adhesive member, and a connecting sleeve connected with said holding sleeve;
said protection tube of said immersion protection tube unit comprises a sintered alumina-graphite protection tube of less than 8 wt % $SiO_2$ formed from a resin type binder of a high carbonization yield, a graphite powder, a powder of a material selected from the group consisting of: SiC derivatives, Si derivatives, $ZrO_2$-$SiO_2$ derivatives, $Al_2O_3$-$ZrO_2$-$S1O_2$ derivatives, and mixtures thereof; and substantially granular and/or powdered alumina;
said porcelain protection tube of said thermocouple unit is detachably inserted into said alumina-graphite protection tube of said immersion protection tube unit with said cylindrical part of the terminal box being in contact with said connecting sleeve of said immersion protection tube unit and with said extension sleeve of said thermocouple unit being detachably inserted into said connecting sleeve of said immersion protection tube unit, a clearance being provided between the end of the porcelain protection tube and the inside end of the alumina-graphite protection tube so as to accommodate their differing rates of thermal expansion; and
a fixing means detachably fixes said extension sleeve and said connecting sleeve with each other to allow easy removal of said thermocouple unit from said immersion protection tube unit.

9. An apparatus for continuously measuring temperature as defined in claim 8, wherein said sintered alumina-graphite protection tube comprises 10 to 40 percent by weight of said graphite powder, 1 to 10 percent by weight of said powder selected from said group consisting of: SiC derivatives, Si derivatives, $ZrO_2$-$SiO_2$ derivatives, $Al_2O_3$-$ZrO_2$-$SiO_2$ derivatives, and mixtures thereof; and 50 to 89 percent by weight of said substantially granular and/or powdered alumina.

* * * * *